United States Patent
McGee et al.

(10) Patent No.: US 11,982,168 B1
(45) Date of Patent: May 14, 2024

(54) FOG ENHANCED AIR TRANSPORTATION INJECTION WELL FOR IN-SITU STEAM/CARBON DIOXIDE GENERATION

(71) Applicant: Phoenix Trust LLC, Dallas, TX (US)

(72) Inventors: Rick McGee, Houston, TX (US); Michael Lee Fraim, Albuquerque, NM (US); Daniel S. Dobson, Dallas, TX (US)

(*) Notice: Subject to any disclaimer, the term of this patent is extended or adjusted under 35 U.S.C. 154(b) by 103 days.

(21) Appl. No.: 17/573,208

(22) Filed: Jan. 11, 2022

(51) Int. Cl.
| | |
|---|---|
| E21B 43/26 | (2006.01) |
| C09K 8/594 | (2006.01) |
| E21B 43/00 | (2006.01) |
| E21B 43/12 | (2006.01) |

(52) U.S. Cl.
CPC .......... *E21B 43/2605* (2020.05); *C09K 8/594* (2013.01); *E21B 43/13* (2020.05)

(58) Field of Classification Search
None
See application file for complete search history.

(56) References Cited

U.S. PATENT DOCUMENTS

| | | | | |
|---|---|---|---|---|
| 3,141,502 A | * | 7/1964 | Dew | E21B 43/243 166/260 |
| 3,314,476 A | * | 4/1967 | Staples | E21B 43/243 166/260 |
| 4,691,773 A | * | 9/1987 | Ward | E21B 43/243 166/272.3 |
| 7,882,893 B2 | | 2/2011 | Fraim | |
| 2003/0141064 A1 | | 7/2003 | Roberson | |
| 2009/0071648 A1 | * | 3/2009 | Hagen | E21B 43/24 166/272.1 |

OTHER PUBLICATIONS

Zangana, M. and Azzopardi, B, "Liquid film properties of gas-liquid flow in large diameter vertical pipe," Conference: Petroleum 2012, vol. 81 DOI: 10.2495/PmR120211.
EIGA Guideline IGC Doc 33/97/E, "Cleaning of Equipment for Oxygen Service," Mar. 3, 1997, rev. 2006.
Wei Wei, Alan Rezazadeh, Jingyi Wang, Ian Gates, "An analysis of toe-to-heel air injection for heavy oil production using machine learning," Journal of Petroleum Science and Engineering 197 (2021) p. 108109.
Leonard J. Hvizdos; John V. Howard; George W. Roberts, "Enhanced Oil Recovery Through Oxygen-Enriched In-Situ Combustion: Test Results from the Forest Hill Field in Texas," J Pet Technol 35 (06), Jun. 83, p. 1061-1070.

(Continued)

*Primary Examiner* — Charles R Nold
(74) *Attorney, Agent, or Firm* — Egbert, McDaniel & Swartz, PLLC

(57) ABSTRACT

A method of oil production after water flooding includes the steps of: forming at least one injection well and at least one production well in a reservoir; pumping enriched air (at least 30-100 mole-% oxygen with fogged water droplets) into the injection well, so as to maximize gravity segregation of gas/steam and gravity drainage of oil from an attic and/or pinch-out volume of the reservoir; and recycling produced carbon dioxide by injection into a man-made gas cap created around the at least one injection well. The enriched air preferably includes a mixture of 30-100 mole-% oxygen, 0-4 mole-% argon, 0-67 mole-% nitrogen and 0-70 mole-carbon dioxide gas.

17 Claims, 4 Drawing Sheets

(56) References Cited

OTHER PUBLICATIONS

H.J.M. Petit, "In-Situ Combustion with Oxygen-Enriched Air," SPE-16741-MS, SPE Annual Technical Conference and Exhibition, Dallas, Texas, Sep. 1987.

James Gordon Hansel; Michael Arthur Benning; John Matthew Fernbacher, "Oxygen In-Situ Combustion for Oil Recovery: Combustion Tube Tests," SPE-11253-PA, J Pet Technol 36 (07), Jul. 1984, p. 1139-1144.

J.R. Rodriguez; D.D. Mamora, "Analytical Model of the Combustion Zone in Oxygen-Enriched in Situ Combustion Tube Experiments," PETSOC-2005-072, Calgary, Alberta, Jun. 2005.

\* cited by examiner

FOG ENHANCED AIR TRANSPORTATION INJECTION WELL FOR IN-SITU STEAM/CARBON DIOXIDE GENERATION

CROSS-REFERENCE TO RELATED APPLICATIONS

Not applicable.

FIELD OF INVENTION

The present invention relates generally to methods for oil extraction and more specifically to in-situ steam generation and in-situ carbon dioxide generation for the recovery of medium to heavy gravity oil. This method is designed for tertiary oil recovery and can be used after water or chemical flooding.

BACKGROUND OF THE INVENTION

To extract the maximum amount of oil from the earth, at least one injection well and at least one production well is drilled per injection pattern in the target oil reservoir. For light to medium gravity oil reservoirs, water-flooding is used to maintain the pressure in the reservoir while the oil is extracted with the production wells. Heavy oil reservoirs require steam injection to reduce the oil viscosity so the oil can flow into the production well. After water-flooding light to medium gravity oil reservoirs or steam flooding a heavy oil reservoir, the residual oil saturation ranges from 30% to 50%, depending on the oil-mobility ratio and sweep efficiency of the flood pattern. To reduce oil saturation below 20%, steam, flue gas or miscible gas is generated in the reservoir to enhance gravity segregation of the oil phase and promote gravity drainage into the production well.

Because of the heavy oil/tar high viscosity, this near solid oil phase cannot be displaced with water, surfactant, or miscible gas injection. As such, thermal oil recovery techniques are used to reduce the in-situ oil viscosity below 100 cp so the oil can be displaced by a fluid or gravity drained at economic rates in the production well. Currently available thermal techniques include surface generated steam, downhole generated steam, downhole electrical conduction heater, and in-situ generated steam/miscible gas mixtures. Tertiary oil recovery techniques are used after conventional steam or water flooding, and of the techniques, in-situ generated heat and steam/miscible gas mixtures have had the best economic field development performance especially for medium gravity crude oils.

Thermal In-Situ Combustion

In the process of in-situ thermal steam/miscible gas generation, a gas containing oxygen or a fluid containing hydrogen peroxide or ammonium nitrate is pumped into the injection well instead of surface generated steam. As the gaseous or fluid oxidizer is pumped into the target oil formation, a fraction of the hydrocarbon in the reservoir volume is oxidized into steam and carbon dioxide and the connate brine is converted to steam. Shale, diatomite, and gypsum are thermally converted to a denser solid state with thermally generated fractures. If the reservoir temperature is below the heavy oil/tar ignition temperature, a hydrocarbon with an ignition temperature lower than reservoir temperature is injected into the reservoir before injection of oxidant. After ignition, the thermal front temperature will be above known heavy oil/tar ignition temperatures and self-sustaining. It is very important to avoid low temperature oxidation of heavy oil/tar since the process converts the hydrocarbon into immobile solid coke "like" phase.

As the oxidation/high-temperature combustion front continues in the reservoir, chromatographic separation will cause additional front formations. These separate zones are created from heat conduction and mass transport as well as chemical reduction and oxidation reactions occurring in the in-situ process. FIG. 1 shows detailed flood fronts for prior art conventional in-situ combustion. The additional fronts include coking/cracking zone, stripping/vaporization zone, steam plateau, hot condensate bank, carbon dioxide rich miscible displacement gas zone, up-graded oil bank, mobile residuum emulsion bank, and hot brine zone. The high-temperature combustion front is only a few inches thick in the reservoir and travels around the surface between the oxygen rich gas phase and the coking/cracking zone. The sudden expansion of the combustion gases gives the burn front a reactionary force to move along the surface.

The coke fuel for the oxidation/high temperature combustion front is generated from the thermal cracking zone. The amount of coke generated determines the combustion front velocity and the amount of oxygen required to move the combustion front. If the amount of coke is less than required to raise the reservoir temperature above the ignition temperature, then the burn front surface will stop moving. Some carbon dioxide generated in the combustion zone is converted to carbon monoxide in the cracking zone and then shifted back to carbon dioxide and hydrogen gas in the steam plateau.

Downstream of the thermal cracking zone is the cracking/vaporization zone. In the cracking/vaporization zone, crude oil is modified by the high temperature of the combustion process and the lighter crude oil components are stripped by the gases generated from the combustion process. The lighter oil components condense and mix with displaced crude oil as the combustion gases flow through the rock matrix. As the heavier oil fractions continue to pyrolyze, they release additional light oil fractions that are also vaporized by the combustion gases. Field experience shows the lighter component addition to the original crude oil can reduce the API gravity by up to 4 units.

The chemical reactions associated with the in-situ combustion process for heavy crude oil and tar are typically complex and numerous even under laboratory test conditions. Associated low-temperature oxidation reactions are heterogeneous gas/liquid reactions producing partially oxygenated compounds and little carbon oxide gases. These reactions increase the heavy oil or tar viscosity and may significantly reduce the sweep efficiency of the in-situ combustion flood. Medium-temperature reactions form the fuel for the combustion zone by cracking and pyrolysis of heavy hydrocarbon fractions. High-temperature oxidation reactions are heterogeneous H-C bond breaking reactions that form a solid fuel (coke) and the coke reacts with oxygen to form steam and carbon oxides. Zones that were only exposed to low-temperature oxidation reactions can switch to high-temperature oxidation reactions as the reservoir formation heats up which in turn causes back burning to the injection well. The intense heat can cause injection well casing damage by melting or splitting the casing with a large pressure pulse.

Typically, the in-situ combustion processes have poor vertical conformance in a layered oil reservoir formation due to the high mobility ratio between hot combustion gases and cold heavy oil/tar. In more precise example, an in-situ combustion process often just burns through one high-permeability layer in the formation and keeps going once it reaches and passes a production wellbore in its path. The produced oxygen gas can ignite oil produced from another layer and start a burn in the production well bore. In such instances, the intense heat then melts the casing and destroys the well. Thus, produced gases must be always monitored for oxygen to prevent ignition in the production well.

The purpose of the invention is to solve some of the current injection and production problems that exist with modern in-situ steam and/or carbon dioxide generation tertiary enhanced oil recovery methods.

BRIEF SUMMARY OF THE INVENTION

The foregoing needs are met for secondary and tertiary production of heavy oil/tar formations, to a great extent, by certain embodiments of the present invention. According to one such embodiment, a method of heavy oil/tar zone production is provided. The method includes drilling at least one injection well and at least one production well in the target formation. The method also includes pumping a mixture of enriched air (30-100 mole-% oxygen, balance other gases) and fogging water with a surfactant based wetting agent into the injection well tubing. The method is called fog enhanced air transportation (FEAT). In addition, the method prevents back burning into the injection wellbore and ignition in the production wellbore by real time tracking of burn fronts in each oil reservoir layer. In addition, possible leaks in the casing cement sheath and in the injection well tubing are monitored in real time with digital temperature surveys.

In addition to the embodiments above, according to certain embodiments of the present invention, ignition of heavy oil/tar in the reservoir volume near the injection well is a balancing act between low-temperature oxidation and high-temperature oxidation to prevent the initial pressure pulse of the ignition of oil in the formation from exceeding fracture gradient in the formation. Ignition of light to medium gravity crude oil is usually in high-temperature oxidation mode and can be ignited with the injection of a low flash point fluid such as linseed/flaxseed oil. The oil film left on the tubulars after injection of the low flash point fluid is removed with a carbon dioxide expanded fluid discussed below.

In addition to the embodiments above, according to certain embodiment of the present invention, the injection well is prepared for ignition by flushing the tubing and formation with carbon dioxide liquid and a lower molecular weight alcohol such as methanol or ethanol or a lower molecular weight aldehyde or ketone such as methanal or ethanal or acetone. When the concentration of carbon dioxide is more than 20 mole-% and less than 85 mole-% in the single-phase liquid, the mixture is considered a carbon dioxide expanded fluid and is very efficient at removing pipe dope, dirt and rust from the tubulars. When the concentration of carbon dioxide exceeds 88 mole-%, the mixture approaches a supercritical carbon dioxide fluid that can extract light to intermediate crude oil fraction into the vapor phase and precipitate the heavy crude oil fraction as a solid phase in the reservoir rock. It is very important to precipitate a solid fuel around the injection well bore before ignition to prevent burn back into the injection wellbore from flow of liquid fluid from the reservoir layer due to an ignition pressure pulse. It is also important to build gas saturation around the injection well before ignition to provide a compressive volume for the ignition pressure pulse to expand into the reservoir volume instead of the injection wellbore volume. If there is no gas saturation and only water and oil saturating the near wellbore volume the ignition pressure pulse usually exceeds the fracture gradient of the reservoir rock especially if the reservoir rock has a permeability less than 50 millidarcies.

In addition to the embodiments above, according to certain embodiment of the present invention, a micro seismic areal sensor array consisting of sensors spaced in a grid pattern on the surface and placed in holes drilled below 200 feet to reduced highway and pumping unit noise and sensors cemented into an observation wellbore near the injection well. Observation wellbore sensors placed to depths greater than 2000 ft. are used to increase the vertical resolution of the burn and steam fronts while the areal grid is used to increase the horizontal resolution. The target vertical resolution is 1-2 ft. to determine any gravity override of the burn front and 2-4 ft. horizontally to estimate the time to breakthrough at each production well for each individual oil reservoir layer. The geophone sensor will detect the compression wave generated from thermal expansion of the reservoir rock and the shear wave generated from slippage of reservoir rock across natural fractures. The micro seismic will also detect fracture generation from shale or gypsum dehydration and the thermal contraction as the reservoir rock cools behind the burn front. Each type of micro seismic event has a different compression and shear wave frequency that can be used to identify the location of front boundaries in the reservoir.

According to certain other embodiments, in the above discussed process, a cyclical addition of a water slug with surfactant is used to generate an in-situ foam bank in the highest permeability layer. As the in-situ generation of steam and carbon dioxide matures in the reservoir, the oxygen rich gas phase will try to break through to the production wells in the highest permeability layer. Oxygen gas break though in the production well will create a hazardous condition downhole where the well bore can be permanently lost. So, the in-situ generated foam bank generated in the highest permeability layer is used to divert oxygen rich gas injection to the lower permeability layers in the oil reservoir.

According to certain other embodiments, in the above discussed process, the pump off fluid level in the production well is set so the back pressure on the perforations is between 50 to 500 psig to prevent the carbon dioxide rich gas from flashing out of solution around the production well bore and reducing oil phase mobility. After breakthrough of the carbon dioxide front, the fluid level can be cyclically altered to enhance foamy oil flow from carbon dioxide expanded crude. The cycling of the reservoir pressure in the production well drainage volume allows the solution gas drive mechanism to displace oil from low permeability zones or dead-end pore volume to re-saturate the high permeability swept zones. As the burn front in the highest permeability layer approaches a production well, the bottomhole pressure can be increased to 500-1200 psig to divert the burn front from the production well bore. As the burn front in the highest permeability layer passes around the production well, brine or brine enhanced with polymer to increase the fluid viscosity can be injected into the highest permeability layer to prevent oxygen rich gas from flowing into the production well bore. For additional safety, the production well can be temporarily abandoned with an acid soluble cement plug across the perforated interval.

For production wells where the burn front is near in at least one layer in the reservoir, real time oxygen concentration monitoring is used to prevent wellbore damage. Individual layers with shale separation greater than 10 ft can be squeeze cemented to isolate the layer. In the event the oxygen sensor detects an oxygen concentration above 4% at the surface, carbon dioxide rich gas is immediately injected to displace all fluids to the perforated interval and prevent ignition in the production well bore. A digital temperature array installed in the production well can detect the cooling from the oxygen contaminated gas expansion at that perforation depth. The layer that is producing the oxygen rich gas is then squeezed with a heavy polymer solution that has a yield stress of at least 20 psi. and then the production well is returned to service. Another option for the production well after detection of oxygen gas in the produced gas is to set a temporary acid soluble cement plug across the productive interval to prevent well damage until it is time to convert the production well into an injection well.

According to certain other embodiments, in the above discussed process, recycling produced carbon dioxide rich produced gas can be accomplished by mixing it with the injected enriched air or injecting it by itself in an additional injection well completed in the oxygen rich gas zone created from the first injection well. When mixing recycled carbon dioxide with enriched air for injection, the carbon dioxide must be near pure where carbon dioxide gas has less than 5 mole-% hydrocarbon gas contamination. On the surface, the recycled carbon dioxide rich produced gas can be catalytically oxidized to near pure carbon dioxide gas so that the produced gas can be safely mixed with enriched air without ignition in the injection wellbore. Another method is the carbon dioxide gas is injected into a dedicated injection well; so, the recycled carbon dioxide gas can have up to 50 mole-% hydrocarbon contamination and it will oxidize to near pure carbon dioxide gas down hole and release heat with a stationary burn front around the additional injection well. The dedicated carbon dioxide injection well could be the original injection well when a new oxygen injection well is completed closer to the burn front and the injected carbon dioxide is used to push the stored oxygen gas towards the burn front.

One embodiment of the present invention is a method of oil production after water flooding comprising the steps of: forming at least one injection well and at least one production well in a reservoir; pumping enriched air comprising at least 30-100 mole-% oxygen with fogged water droplets into the injection well, so as to maximize gravity segregation of gas/steam and gravity drainage of oil from an attic and/or pinch-out volume of the reservoir, and recycling produced carbon dioxide by injection into a man-made gas cap created around the at least one injection well. Preferably, the enriched air is a mixture of 30-100 mole-% oxygen, 0-4 mole-% argon, 0-67 mole-20% nitrogen and 0-70 mole-% carbon dioxide gas.

In an embodiment, the method further includes tracking burn and steam front locations using a micro seismic array having 10-2,000 HZ sensitivity on the surface. The micro seismic array monitors the burn and steam front locations in three-dimensional space using compressive wave emissions due to thermal rock matrix expansion and using shear wave emissions due to rock matrix sliding along natural fractures.

In an embodiment, the method further includes using a digital temperature survey positioned along a casing or injection tubing to identify leaks from the casing or injection tubing or to identify migration of oxygen rich gas through a fracture in the cement sheath surrounding the casing or injection tubing.

In an embodiment, the method further includes oxygen gas injection into multiple permeable layers to burn through or thermally fracture thin non-permeable shale, dolomite or anhydrite layers to maximize gravity drainage of oil to the production well.

In an embodiment, the method further includes completing at least one additional injection well in the man-made gas cap to recycle produced carbon dioxide gas when hydrocarbon contamination is over 5 mole-%.

In an embodiment, the method further includes catalytic oxidation of hydrocarbon contamination in the produced carbon dioxide gas to achieve at least 98% purity of carbon dioxide gas.

In an embodiment, the method further includes holding a back pressure or fluid level in the at least one production well equivalent to 50 to 500 psig to prevent the man-made gas cap from coning into the at least one production well.

In an embodiment, the method further includes intermittent injection of recycled or stored carbon dioxide gas with less than 5 mole-% oxygen to prevent back burn into the bore of the injection well from a higher reservoir pressure layer into a lower reservoir pressure layer, wherein a 100 psig/minute injection pressure increase is used to detect back burn into the bore of the injection well to initiate carbon dioxide injection and flush tubing near the wellbore volume to prevent casing damage.

In an embodiment, the method further includes cleaning pipe thread dope and oil film from installation of a tubular into the injection well by flushing with liquid methanol or ethanol and drying with carbon dioxide with less than 5 mole-% or less hydrocarbon composition.

In an embodiment, the method further includes adding a neutral-wet surfactant and glycerol up to 66% to water utilized for the fogged water droplets to uniformly coat the tubular surface with water film while preventing freezing of the water phase at operational surface temperature as low as –50 degrees F. A water external phase emulsion may be prepared using flax seed or linseed oil, and the water external phase emulsion may be injected prior to the step of adding a neutral-wet surfactant and glycerol.

In an embodiment, the fogged water droplets comprise a volume of water between 103% to 116% of an amount required to saturate a gas stream to prevent excessive water saturation around a perforated interval of the bore of the injection well and to prevent filling a bottom of the wellbore with a liquid water phase that covers perforations.

In an embodiment, the method further includes fogging a synthetic oil phase to uniformly coat a tubular surface with oil film, wherein the synthetic oil phase has a limiting oxygen index of 95+ and a flash point over 500 F.

In an embodiment, the method further includes using high density plastic coating or a fiberglass lined tubular to prevent corrosion and sparking, and using PTFE or Viton ring seals to prevent gas leakage at threaded connections.

In an embodiment, the recycled produced carbon dioxide has 5 mole-% or less hydrocarbon composition or below a lower explosion limit of the oxygen-carbon dioxide mixture.

In an embodiment, the recycled production water utilized for the fogged water droplets is maintained at a pH level between 7 to 9, a total dissolved solids less than 100,000 ppm, a scaling index for divalent ions less than –1, and total petroleum hydrocarbon or total chemical oxygen demand less than 10 ppm in the water phase to control corrosion of the tubulars and valve bodies.

With the coarse discussion of certain embodiments of the invention above, the detailed description should be better understood and the contribution to the art may be better appreciated. Additional embodiments of the invention that will be described below and which will form the subject matter of the claims appended hereto. In respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described for specific oil reservoirs and carried out in various ways. Also, it is to be understood that the phraseology and terminology employed herein, as well as the abstract, are for the purpose of description and should not be regarded as limiting.

DETAILED DESCRIPTION OF THE INVENTION

Figure 1:
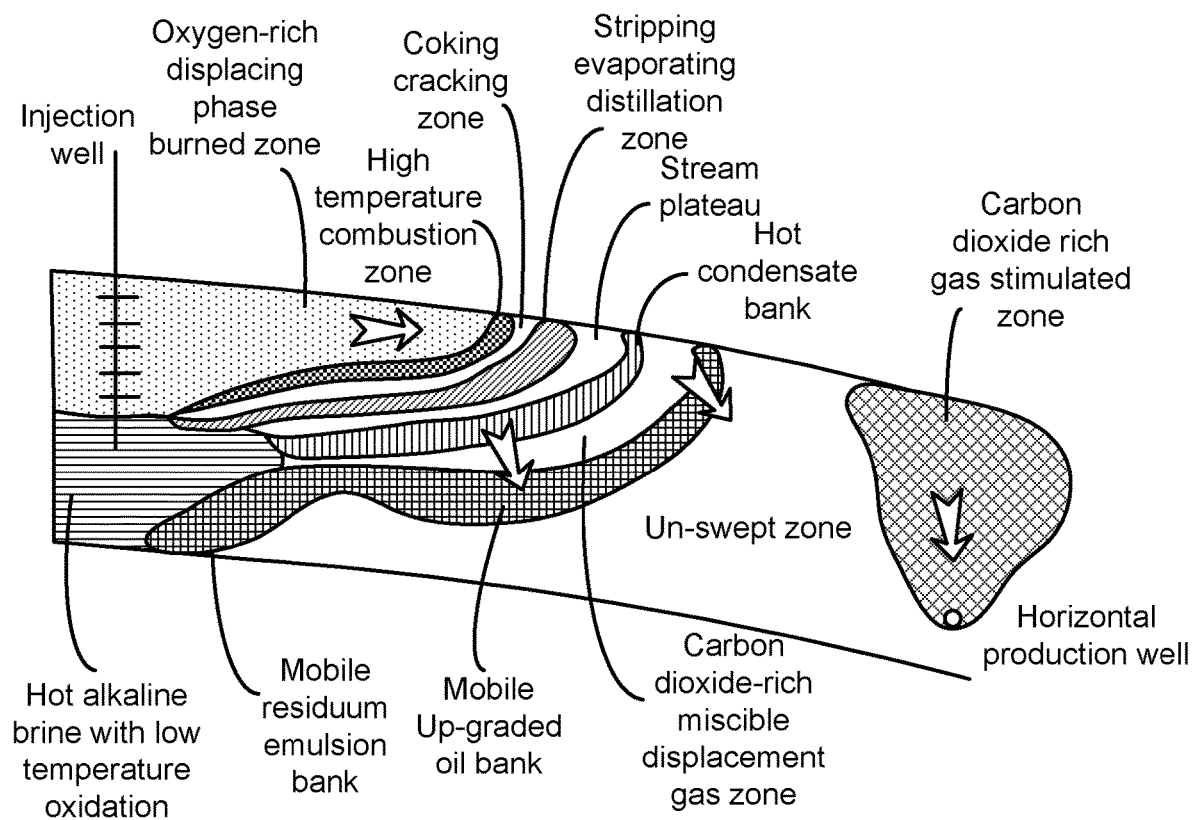
FIG. 1 illustrates a cross-sectional view of an oil production process according to the embodiment of the invention and previous prior art.

The invention will now be described with reference to the drawing figures, in which like reference materials refer to like parts throughout. This fogged enriched air transportation method is an in-situ wet combustion technique that uses the high-water saturation left by water flooding or water drive in the oil reservoir to generate a steam front with near-pure oxygen gas combustion of the coke fuel. Carbon-dioxide-rich flue gas prevents low-temperature oxidation of the heavy oil fraction of the crude oil and promotes near-miscible stripping of the light and medium oil fractions of the crude oil. Nitrogen gas contamination over 5% of the injected near-pure oxygen gas will cause additional fuel laydown and reduce the miscibility of the carbon dioxide rich fuel gas with the crude oil and cause detrimental gas override in the layer. Gas override reduces volumetric sweep efficiency and lowers oil production rates.

The steam front is created from the water saturation in the reservoir rock and the heat from the burn front. The heat from steam front causes the carbon dioxide saturated light oil fraction to vaporize from dead end pore space, bypassed very low permeability geo-bodies and about 2 feet thickness of oil saturated shale in contact with the oil formation. The steam vapor sweeps the vaporized oil forward to condense as lighter gravity crude oil saturated with carbon dioxide. This method allows the residual hydrocarbon liquid phase to be laterally displaced to a production well at economic oil production rates.

As the burn front proceeds towards a production well, the carbon dioxide gas concentration will increase in the produced gas to the point where it is economic to recycle the carbon dioxide gas by co-injecting with the near-pure oxygen gas into the injection well. Carbon dioxide gas chromatographically strips the light end oil fraction from the crude oil as it saturates the crude oil starting with the methane or nitrogen component first. Which means the produced gas will see an increase in methane and nitrogen concentration as the reservoir volume saturates with carbon dioxide gas.

Figure 2:
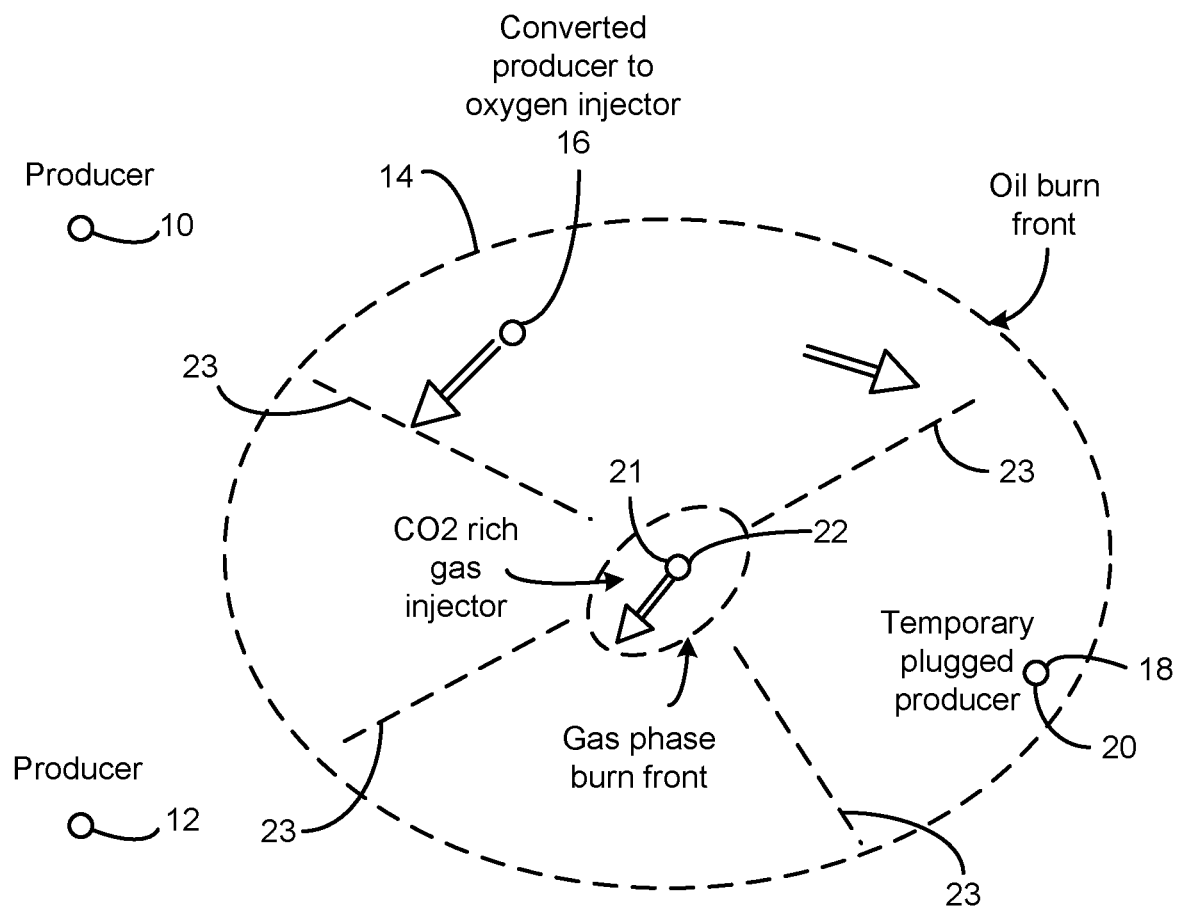
FIG. 2 illustrates a production well completed with 2 layers showing flow directions and aerial view.

FIG. 2 demonstrates a typical burn front with production and injection wells for a reservoir closed anticlinal structure. The two production wells 10 and 12 outside the burn front 14 are producing carbon dioxide saturated oil with a back pressure of 500 psig down hole. In accordance with the method of the present invention one production well 16 has been converted to an oxygen injector and another production well 18 has been temporarily abandoned by setting an acid soluble cement plug 20 across the productive interval to prevent well damage until it is time to convert the production well to an injection well. All the fronts demonstrated in FIG. 1 are moving down dip of the closed anticlinal structure.

In the method of the present invention, enriched air is pumped into the converted oxygen injector well 16. Preferably, the enriched air is a mixture of 30-100 mole-% oxygen, 0-4 mole-% argon, 0-67 mole-% nitrogen and 0-70 mole-% carbon dioxide gas. The optimum enriched air could comprise 100 mole-% oxygen, though equipment has been developed enabling 90-96 mole-% oxygen. The enriched air has fogged water droplets therein. This injection maximizes gravity segregation of gas/steam and gravity drainage of oil from the attic and/or pinch-out volume of the reservoir.

Produced carbon dioxide is then recycled by injection back into a man-made gas cap 21 on a previous production well 22. The injection of enriched air creates the gas cap 21, and it is an ideal location to sequester carbon dioxide created in the process of the invention. In addition to the environmental benefit of sequestration, injection of the carbon dioxide into an existing enriched air injector additionally pushes previously-injected oxygen downdip towards the combustion front.

For oil reservoirs that have a structure, a production well can be converted to an injection well after the burn passes in the highest permeability layer, then the original injection well can be converted to a carbon dioxide rich gas injector to displace stored oxygen rich gas towards the burn front. If the injected carbon dioxide rich gas contains at least 10% hydrocarbon gas, then the carbon dioxide gas will ignite to form a second burn front to laterally displace the stored oxygen gas toward the primary burn front as shown in FIG. 2.

Recycling produced carbon dioxide rich produced gas can be accomplished by mixing it with the injected enriched air at injector 16 or injecting it by itself in injection well 22, or in another injection well subsequently created in the oxygen rich gas zone created from the first injection well 22. When mixing recycled carbon dioxide with enriched air for injection, the carbon dioxide must be near pure where carbon dioxide gas has less than 5 mole-% hydrocarbon gas contamination. On the surface, the recycled carbon dioxide rich produced gas can be catalytically oxidized to near pure carbon dioxide gas (preferably at least 98%) so that the produced gas can be safely mixed with enriched air without ignition in the injection wellbore. Another method is the carbon dioxide gas is injected into a dedicated injection well; so, the recycled carbon dioxide gas can have up to 50 mole-% hydrocarbon contamination and it will oxidize to near pure carbon dioxide in the reservoir and release heat with a stationary burn front around the additional injection well. The dedicated carbon dioxide injection well could be the original injection well 22 when a new oxygen injection well is completed closer to the burn front and the injected carbon dioxide is used to push the stored oxygen gas towards the burn front.

Figure 4:
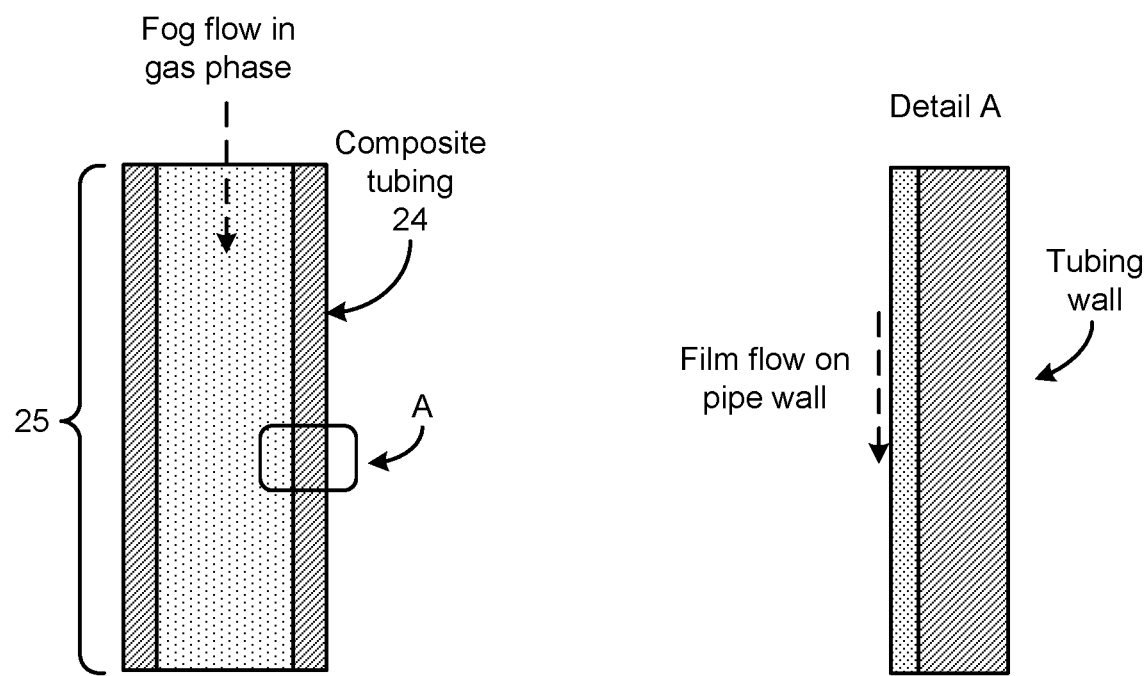
FIG. 4 illustrates the fog and film flow in pipe or tubing of the present invention.

According to certain embodiments of the present invention, the injection well tubing and injection pipeline 24 (in FIG. 4) are preferably made using high density plastic coating or are lined with a fiberglass liner made from high temperature epoxy or phenolic resin to prevent corrosion in the injection system and prevent iron oxide dust catalyzing ignition of the steel alloy tubing. The injection well tubing and injection pipeline 24 could also utilize PTFE or Viton ring seals to prevent gas leakage at threaded connections. The packer fluid for the injection tubing preferably contains a corrosion inhibitor and an oxygen gas adsorbent such as amine-based compounds. The pumped enriched air mixture may also include a surfactant (preferably neutral-wet) or a light synthetic oil with a limiting oxygen index of 95+, a flash point over 500 F, and a viscosity less than 60 centipoise as demonstrated in FIG. 4. This fogging method provides a uniform liquid film on the fiberglass or metal surfaces of the tubing 24 to prevent long term corrosion by oxygen gas and dust sized particles and eliminates the possibility of static charge ignition from dust particle movement. For co-current liquid film and gas flow, the film thickness should range from 0.8 to 2.2 mm depending on viscosity of the liquid flowing down the tubing 24.

For low pressure injection, an ultrasonic fogging nozzle can be used and for high pressure injection, an impact swirl nozzle can be used to generate fog droplets between 5 to 30 microns in diameter. The fogging volume of liquid injected to coat the tubulars should match the evaporation rate of the liquid film coating from injection point to perforations, otherwise liquid build up around the injection well will reduce oxygen gas injectivity. The liquid build-up around the injection well can be removed with dry carbon dioxide gas injection. Preferably, a volume of water between 103% to 116% of the amount required to saturate the gas stream is injected to prevent excessive water saturation around the perforated interval of the injection well bore and to prevent filling the bottom of the wellbore with a liquid water phase that covers perforations. Synthetic oil requires only periodic injection to maintain liquid film since it does not significantly evaporate in dry oxygen gas, and due to high viscosity, it does not significantly film flow down the tubular wall.

In addition, according to certain other embodiments of the present invention, ignition of the reservoir volume around the injection well presents a technical challenge to prevent pressure pulses from exceeding fracture gradient of the reservoir rock matrix and to prevent a back flow of hydrocarbon gas, carbon monoxide gas, and/or hydrogen gas from entering the injection well. To enhance a smooth ignition of the burn front, a combustion catalyst such as potassium carbonate or chloride salt and a hydrocarbon oil with a very low flash point can be injected into the near reservoir volume around the injection well. Normal combustion catalyst such as iron nitrate or other metallic salts should be avoided because they enhance the oxygen gas corrosion rate of stainless-steel wetted parts to near-pure oxygen gas in the presence of water. Corrosion of steel parts will generate iron oxide dust that can cause ignition of metal or fiberglass with long term exposure. A real time digital temperature survey 25 may be provided along the injection tubing 24 and can detect leaks with a drop in temperature and pin-hole corrosion spots with an increase in temperature.

A 55-gallon drum of flax seed or linseed oil can be emulsified with water to make a water external phase emulsion and injected into the formation before the surfactant clean-up wash of the tubing. A potassium salt combustion catalyst can be added to the clean-up surfactant water phase with a concentration from 3000 to 10000 ppm. Methanol or ethanol can be used to clean-up the remaining hydrocarbon film and salt dust left on the tubing after the linseed oil injection and surfactant wash. Carbon dioxide or nitrogen gas can be used to dry the tubing and create the gas phase saturation around the wellbore before ignition to adsorb the pressure pulse of ignition of the oil. The emulsified linseed oil lowers the time in which low temperature oxidation is used to heat the reservoir enough to cause high temperature ignition. Boron hydride can be co-injected with carbon dioxide or nitrogen gas if the reservoir is shallow and has a reservoir temperature below the ignition temperature of linseed oil. Carbon dioxide is the preferred gas for co-injection ignition along with enriched air because it cools the tubing down by 25 degrees F. when it is mixed with oxygen, thus giving an additional temperature cushion to the downhole tubulars in case of a possible flash back from each layer as it ignites.

Figure 3:
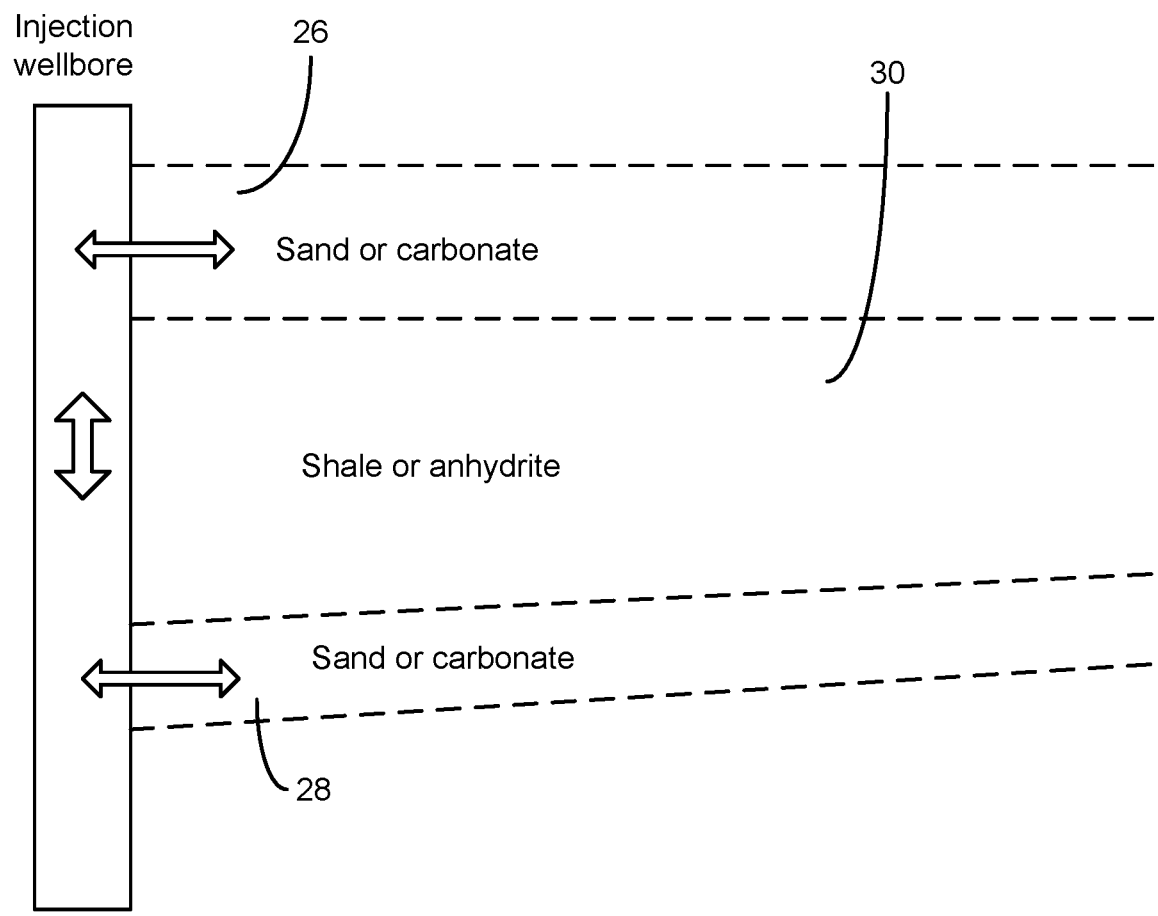
FIG. 3 illustrates an injection well completed with two layers showing flow directions through perforations.

FIG. 3 shows a detailed cross section of two productive oil layers 26 and 28 separated by a shale or anhydrite layer 30. One layer will nearly always have a higher injectivity than the other layer due to difference in reservoir rock permeability. For an injection well, gas flow is normally into the formation through the perforations in the casing except during ignition when the liquid water saturation expands by at least 100-fold. Field experience shows the injection well may have to be killed with carbon dioxide or nitrogen gas as the second and subsequent layers ignite due to the flash back phenomena of ignition of low permeability layers. Nitrogen gas stored at higher pressure than surface injection pressure is easier and cheaper to use for quick displacement of the tubing when back draft is detected during normal injection. Water or aqueous phase can't be used to kill a flash back in an injection well because the water piston will compress the oxygen-rich hydrocarbon contaminated gas mixture beyond the compression ignition point of the mixture and it will ignite in the casing. Gas killing of an injection well will not compression ignite the oxygen-rich hydrocarbon gas mixture because inert gas does not have the density and inert gas is diluting the mixture below the ignition composition as it displaces the oxygen-rich hydrocarbon gas mixture. Several field examples have shown loss of the injection well casing and tubing when the well was killed with water.

In the present invention, intermittent injection of recycled or stored carbon dioxide gas with less than 5 mole-% oxygen may be provided so as to prevent back burn into the injection well bore from a higher reservoir pressure layer into a lower reservoir pressure layer. Preferably, a 100 psig/minute injection pressure increase is used to detect a back burn into the injection well bore to initiate carbon dioxide injection and flush the tubing and near wellbore volume to prevent casing damage.

In FIG. 3, the second layer 30 is tilted from horizontal due to geology plate movement or due to sediment laydown. The tilted layer 30 enhances the formation of a segregated gas channel as the burn front approaches the top of the reservoir. The hot oil liquid phase will flow down dip as the gas phase flows up dip as demonstrated when flipping a full large plastic pop bottle. In the reservoir, the oil phase flows down more slowly than the gas phase flows up even when it is burning at the gas-oil interface in the reservoir rock matrix. A real time digital temperature survey installed in the casing cement sheath can detect the reverse flow phenomena with hot oil entering the lower perforations. The reverse flow can also be detected with the real-time injection pressure increase. If the injection well is shut-in for reasons such as an electrical power outage during the early life of the injection well, the operator must assume that hydrocarbon gas or oil reverse flowed into the wellbore from one layer to another layer as gravity and thermal segregation continue to operate in the reservoir, so the wellbore should be flushed with surfactant solution and dried with inert gas before recommencing near-pure oxygen injection. During normal operations, the wellbore temperature can increase due to the burn front crude oil flowing down dip near the injection well. Carbon dioxide injection as a liquid or dense phase gas is the best kill fluid since the fluid has twice the density of oxygen gas and three times the heat capacity to absorb the increase in temperature at the well bore. Nitrogen gas has slightly less density than oxygen gas and nearly the same heat capacity as oxygen gas so injection of nitrogen gas will not cool the wellbore as quickly as carbon dioxide.

In the present invention, oxygen gas may be injected into multiple permeable layers of the formation, so as to burn through or thermally fracture thin non-permeable shale, dolomite or anhydrite layers to maximize gravity drainage of the oil to the production well.

A micro-seismic array 23 may be used to track the initial burn front during ignition and then track the chromatic separation of the steam and carbon-dioxide-rich gas fronts as the in-situ thermal recovery of oil matures. The micro-seismic array 23 is illustrated on FIG. 2 as extending radially away from the injection well 22, but may be positioned in any number of configurations. Preferably, the micro-seismic array 23 has a sensitivity of 10-2,000 Hz. Micro-seismic detects the thermal expansion of the rock matrix with movement of rock faces along natural fractures and it also detects the thermal fracturing of the rock matrix in the burn front interface. Thermal fracturing usually starts around 500-degree F. in the coking zone and continues to 1000-degree F. in the burn zone. Oil and water expulsion can be detected in the shale layers as the high pressure opens natural fractures to allow steam and oil vapor to escape. Micro-seismic is also used to detect fracturing around the injection well during ignition events and detect flow of injection gas through created open fractures to non-productive zones. Micro-seismic can help define where the burn front in each layer is moving so production wells and production facilities can be instrumented for detection of oxygen gas in real time.

Referring to FIG. 3 as a cross section for two productive oil layers 26 and 30 in a vertical production well separated by a shale or anhydrite layer 30. The high permeability layer will show the first carbon-dioxide-rich gas response as well as the increased oil flow due to increased reservoir pressure maintenance from the in-situ combustion process. The in-situ combustion process has the highest-pressure support proportionate to the amount of mass injected when compared to a water, steam or carbon dioxide gas flood. Back pressure can be increased on the perforations by holding a higher fluid level in the casing for a beam pumped oil well. In the present invention, the method includes holding a back pressure or fluid level in the production well equivalent to 50 to 500 psig to prevent the gas cap from coning into the production well. For some light oil reservoirs, the oil and water can be gas lifted to the surface with the extra carbon dioxide gas released as the fluid enters the perforations in the production casing. Even a small concentration of oxygen gas in the produced gas can greatly accelerate corrosion rate of the bare carbon steel tubing, therefore the production tubing could be internally coated with fiberglass from pump to surface to reduce the corrosion rate. An electronic corrosion meter can be installed on the production flow line and the free water knock-out to monitor the corrosion inhibitor injection program.

If the crude oil has high sulfur content, the possibility of making hydrogen sulfide in the pyrolyzable zone in front of the burn front is high. Field experience shows that for every 2 percent sulfur in the oil there is the possibility of concentrations of 100 ppm of hydrogen sulfide in the produced gas and it will not be constant but small-time pulses of contamination that can cause corrosion of steel production lines and production equipment. Oxygen and hydrogen sulfide contamination are very corrosive even to coated tubing with pin holes in the coating. Real time detection of oxygen and hydrogen sulfide is needed as the carbon dioxide front approaches the production well to make sure enough corrosion inhibitor and hydrogen sulfide and oxygen scavengers are injected in the casing-tubing annulus to remove and control the problem. Besides using near-real time micro-seismic analysis, the carbon dioxide front can be detected at the production well with real time produced gas analysis using a gas chromatograph or specialized meter. Real time digital temperature behind the production casing can detect fluid flow through a perforation. For example, expansion of gas flow causes a large temperature drop while oil/water flow causes a small temperature increase.

For secondary and primary sour-gas oil reservoirs, the production water must be chemically or electro-chemically treated to 1000 mv ORP and filtered to 20 microns to remove brine soluble sulfur-hydrocarbon compounds including hydrogen sulfide gas before recycling back to the injection process. This process ensures that the total chemical oxygen demand (COD<10 ppm) is less than 10 ppm and the total organic carbon (TOC<10 ppm) is less than 10 ppm. For sweet, produced brine, it should be treated to 900 mv ORP and filtered to 20 microns to prevent generating significant dust or scale deposits in the injection well tubing. After oxidation treatment of the produced water, the pH should be adjusted with sodium carbonate or sodium hydroxide to be between 7 and 9 to prevent corrosion. The scaling index for divalent ions should be less than −1 for any divalent ion in the brine and the iron oxide ion or other metal oxide ions should be removed to below 1 ppm.

For winter operation of surface facilities below 32 degrees F., the freshwater phase will freeze and plug the injection line, so antifreeze must be added to the water phase to prevent freezing. Glycerol is a preferred antifreeze to ethylene glycol because glycerol has a flash point of 320 degrees F. versus 287 degrees F. for ethylene glycol, so the 50%/50% mixture will have a flashpoint over 500 degrees F. and the 66%/34% mixture of glycerol/water is liquid to −50 degrees F. Another advantage is glycerol/water mixtures have a higher viscosity than ethylene glycol/water mixtures, so water/glycerol mixtures will have a thicker film on the tubular wall and will require less volume injection over time since the water/glycerol mixture slides down the wall slower.

When converting a production well to an injection well, the perforated interval of casing must be cleaned of all hydrocarbon contamination, scale and rust. Usually, a surfactant enhanced chelating fluid will remove the hydrocarbon, scale, and rust on the casing and near reservoir volume around the perforations. Field experience and short core tests show that carbon dioxide gas enhanced with methanol or isopropyl alcohol will sufficiently clean up the coated tubing and the near reservoir volume of asphaltene deposits when the bottom hole pressure is above 1500 psi. The safety concern is the asphaltene deposits can ignite after ignition of the oil zone and can cause a flash back to the injection well casing.

It is very technically challenging to track the burn front by layer in the reservoir volume because it moves around in a circular manner on an anticlinal closed structure for each isolated oil reservoir layer. Sometimes the burn front will burn through a thin shale separating two oil reservoir layers and they will link up and burn together. Monthly gas injection spinner surveys can be used to calibrate allocation to each individual oil reservoir layer and detect when a layer is not being swept due to the oxygen injection below the minimum oxygen flux. The spinner survey tool should use clean, hydrocarbon-free plastic standoffs to prevent scratching the composite coating on the tubing. Oxygen gas flux must be maintained above 1 ft/day at the burn front interface in each layer to keep the burn front in high-temperature oxidation mode. So, for closed anticline structures, the burn front area increases with time and additional injection wells must be drilled or production wells converted to injection wells to maintain the correct oxygen flux to the burn front. For in-situ combustion well pattern development, the oxygen flux is maintained with the next line drive of injection wells.

Geo-mechanical modeling of the thermal and pressure expansion of the rock matrix to match the micro seismic data requires detailed rock mechanical analysis as well as a detailed oil combustion analysis to estimate the burn front temperature as it cycles around the burn front interface in the reservoir. Dipole sonic log from production interval to surface and vertical seismic profiling will help with the depth calibration of the micro seismic array. The micro-seismic data should include both the compression and shear wave components so each front can be detected from each front's seismic attribute.

The front detection data from seismic analysis is used in the numerical simulation model to match the volumetric material balance of each process front and determine connectivity and permeability of the reservoir layers after exposure to thermally induced fracturing of layers. The production gas analysis match from the numerical model is also used to predict the time the production wells need to be temporarily abandoned while the burn front travels around the wellbore.

With the coarse discussion of certain embodiments of the invention above, the detailed description should be better understood and the contribution to the art may be better appreciated. Additional embodiments of the invention that were described above will form the subject matter of the claims appended hereto.

REFERENCES

1. Zangana, M. and Azzopardi, B, "Liquid film properties of gas-liquid flow in large diameter vertical pipe," Conference: Petroleum 2012, Vol. 81 DOI: 10.2495/PmR120211
2. EIGA Guideline IGC Doc 33/97/E, "Cleaning of Equipment for Oxygen Service"
3. U.S. Pat. No. 7,882,893, "Combined Miscible Drive for Heavy Oil Production"
4. US Patent 20030141064, "Method and apparatus for fracing earth formations surrounding a wellbore"
5. Wei Wei, Alan Rezazadeh, Jingyi Wang, Ian Gates, "An analysis of toe-to-heel air injection for heavy oil production using machine learning," Journal of Petroleum Science and Engineering 197 (2021) p. 108109.
6. Leonard J. Hvizdos; John V. Howard; George W. Roberts, "Enhanced Oil Recovery Through Oxygen-Enriched In-Situ Combustion: Test Results from the Forest Hill Field in Texas," J Pet Technol 35 (06), June 83, p. 1061-1070.
7. J. R. Rodriguez; D. D. Mamora, "Analytical Model of the Combustion Zone in Oxygen-Enriched in Situ Combustion Tube Experiments," PETSOC-2005-072, Calgary, Alberta, June 2005.
8. H. J. M. Petit, "In-Situ Combustion with Oxygen-Enriched Air," SPE-16741-MS, SPE Annual Technical Conference and Exhibition, Dallas, Texas, September 1987.
9. James Gordon Hansel; Michael Arthur Benning; John Matthew Fernbacher, "Oxygen In-Situ Combustion for Oil Recovery: Combustion Tube Tests," SPE-11253-PA, J Pet Technol 36 (07), July 1984, p. 1139-1144.

We claim:

1. A method of oil production after water flooding comprising the steps of:
   forming at least one injection well and at least one production well in a reservoir;
   pumping enriched air comprising at least 30 mole-% oxygen with fogged water droplets into the injection well, so as to maximize gravity segregation of gas/steam and gravity drainage of oil from an attic and/or pinch-out volume of the reservoir; and
   recycling produced carbon dioxide by injection into a man-made gas cap created around the at least one injection well.

2. The method of oil production of claim 1, said enriched air comprising a mixture of 30-100 mole-% oxygen, 0-4 mole-% argon, 0-67 mole-% nitrogen and 0-70 mole-% carbon dioxide gas.

3. The method of claim 1, further comprising tracking burn and steam front locations using a micro seismic array having 10-2,000 HZ sensitivity on the surface, the micro seismic array monitoring the burn and steam front locations in three-dimensional space using compressive wave emissions due to thermal rock matrix expansion and shear wave emissions due to rock matrix sliding along natural fractures.

4. The method of claim 1, further comprising using a digital temperature survey positioned along a casing or injection tubing to identify leaks from the casing or injection tubing or to identify migration of oxygen rich gas through a fracture in a cement sheath surrounding the casing or injection tubing.

5. The method of claim 1, further comprising injecting oxygen gas into multiple permeable layers to burn through or thermally fracture thin non-permeable shale, dolomite or anhydrite layers to maximize gravity drainage of oil to the at least one production well.

6. The method of claim 1, further comprising completing at least one additional injection well in the man-made gas cap to recycle produced carbon dioxide gas when hydrocarbon contamination is over 5 mole-%.

7. The method of claim 1, further comprising catalytic oxidation of hydrocarbon contamination in the produced carbon dioxide to achieve at least 98% purity of carbon dioxide gas.

8. The method of claim 1, further comprising holding a back pressure or fluid level in the at least one production well equivalent to 50 to 500 psig to prevent the man-made gas cap from coning into the at least one production well.

9. The method of claim 1, further comprising intermittent injection of recycled or stored carbon dioxide gas with less than 5 mole-% oxygen to prevent back burn into the bore of the injection well from a higher reservoir pressure layer into a lower reservoir pressure layer.

10. The method in claim 1, further comprising cleaning pipe thread dope and oil film from installation of a tubular into the injection well by flushing with liquid methanol or ethanol and drying with carbon dioxide with less than 5 mole-% or less hydrocarbon composition.

11. The method of claim 1, further comprising adding a neutral-wet surfactant and glycerol up to 66% to water utilized for the fogged water droplets to uniformly coat the tubular surface with water film while preventing freezing of the water phase at operational surface temperature as low as −50 degrees F.

12. The method of claim 11, further comprising the steps of: preparing a water external phase emulsion using flax seed or linseed oil; and injecting the water external phase emulsion prior to the step of adding a neutral-wet surfactant and glycerol.

13. The method in claim 1, further comprising fogging a synthetic oil phase to uniformly coat a tubular surface with oil film, wherein the synthetic oil phase has a limiting oxygen index of 95+ and a flash point over 500 F.

14. The method in claim 1, further comprising using high density plastic coating or a fiberglass lined tubular to prevent corrosion and sparking, and using PTFE or Viton ring seals to prevent gas leakage at threaded connections.

15. The method in claim 1, wherein the recycled produced carbon dioxide has 5 mole-% or less hydrocarbon composition or below a lower explosion limit of the oxygen-carbon dioxide mixture.

16. The method in claim 1, wherein recycled production water utilized for the fogged water droplets is maintained at a pH level between 7 to 9, a total dissolved solids less than 100,000 ppm, a scaling index for divalent ions less than −1, and total petroleum hydrocarbon or total chemical oxygen demand less than 10 ppm in the water phase to control corrosion of the tubulars and valve bodies.

17. A method of oil production after water flooding comprising the steps of:

forming at least one injection well and at least one production well in a reservoir; and pumping enriched air comprising at least 30 mole-% oxygen with fogged water droplets into the injection well, so as to maximize gravity segregation of gas/steam and gravity drainage of oil from an attic and/or pinch-out volume of the reservoir.

* * * * *